(12) United States Patent
Fink et al.

(10) Patent No.: US 8,772,390 B1
(45) Date of Patent: Jul. 8, 2014

(54) SPRAYABLE POLYMERIC COATING SYSTEM FOR THE PROTECTION OF COMPLEX METAL STRUCTURES AGAINST CORROSION

(75) Inventors: Thomas Georg Fink, Tomball, TX (US); Emilio Cesar Castro, Tomball, TX (US)

(73) Assignee: Oxifree Holdings Corp, Panama City (PA)

( * ) Notice: Subject to any disclaimer, the term of this patent is extended or adjusted under 35 U.S.C. 154(b) by 0 days.

(21) Appl. No.: 13/549,023

(22) Filed: Jul. 13, 2012

Related U.S. Application Data

(60) Provisional application No. 61/507,326, filed on Jul. 13, 2011.

(51) Int. Cl.
*C08K 5/10* (2006.01)

(52) U.S. Cl.
USPC .......................................................... 524/318

(58) Field of Classification Search
None
See application file for complete search history.

(56) References Cited

U.S. PATENT DOCUMENTS

| | | | |
|---|---|---|---|
| 2,180,427 A | 11/1939 | Moncrieff et al. | |
| 2,426,379 A | 8/1947 | Swain at al. | |
| 2,599,384 A | 6/1952 | Gross at al. | |
| 2,843,503 A | 7/1958 | Salo at al. | |
| 2,892,725 A | 6/1959 | Rosenthal | |
| 2,927,031 A | 3/1960 | Rosenthal | |
| 2,927,036 A * | 3/1960 | Seaver, III | 106/170.15 |
| 3,220,866 A | 11/1965 | Rosenthal | |
| 3,505,244 A | 4/1970 | Cessna | |
| 3,839,051 A | 10/1974 | Cerveny | |
| 5,081,174 A | 1/1992 | VanBuskirk | |
| 2002/0119252 A1 | 8/2002 | Haycox | |
| 2006/0020062 A1* | 1/2006 | Bloom | 524/114 |
| 2007/0225160 A1* | 9/2007 | Kitano et al. | 502/402 |
| 2008/0171212 A1 | 7/2008 | Shedlosky et al. | |

OTHER PUBLICATIONS

Roche, Gregory, Low-VOC Coatings Using Reactive Diluents Demonstration Project, EPA, EPA/600/SR-98-043, pp. 1-3.*
Wypych, Handbook of Fillers, 3rd Edition, pp. 20, 127-128, 143-147.*

* cited by examiner

*Primary Examiner* — Irina Krylova
*Assistant Examiner* — Robert T Butcher

(57) ABSTRACT

A method of applying a protective polymeric coating to a substrate has the steps of mixing a cellulose acetate buterate and a plasticizer and a corrosion inhibitor together to form a solid mixture, heating the solid mixture so as to form a liquid state, painting the substrate with the liquid state, and drying the liquid state on the substrate for a period of time. The step of painting can include spraying the liquid state of the mixture onto the substrate. The plasticizer is an epoxidized fatty acid ester. The corrosion inhibitor is epoxidized canola oil. Additionally, epoxidized soil bean oil, silica amorphous and titanium dioxide can be mixed together.

1 Claim, 2 Drawing Sheets

SPRAYABLE POLYMERIC COATING SYSTEM FOR THE PROTECTION OF COMPLEX METAL STRUCTURES AGAINST CORROSION

RELATED U.S. APPLICATIONS

The present invention claims priority from U.S. Provisional Patent Application No. 61/507,326, filed on Jul. 13, 2011 and entitled "Sprayable Polymeric Coating System for the Protection of Complex Metal Structures Against Corrosion".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the coating of metal structures. More particularly, the present invention relates to corrosion-proof coatings that can be sprayed upon substrates and metal structures. Additionally, the present invention relates sprayable polymeric coatings that can be used in association with bolted, jointed, or operable metallic components.

2. Description of Related Art Including Information Disclosed Under 37 CFR 1.97 and 37 CFR 1.98

Metallic structures that are used for infrastructure and industry can be the victims of the effects of oxidization. This oxidization can cause the structures to degrade and, in some cases, completely lose structural integrity.

The factors that cause the degradation of metallic structures can include galvanic corrosion, atmospheric corrosion and chemical corrosion. In particular, with reference to FIG. 1, at the interface between the water droplet, carbon steel and air, oxidation will exist. This will commence the reduction of the metal surface. An electron flow from the anode to the cathode will occur. The metal or metals of a structure serve as the anode, the cathode and the necessary metallic conductor between the two. Water, or moisture in the soil, provides the electrolyte required to complete the cell circuit. Such cells develop their driving force or electrical potential for differing conditions at the interfaces between the anode and cathode of metal and the electrolyte. these differences fall into three categories: (1) dissimilar metals comprising the anode and the cathode; (2) inhomogeneity of a single metal which causes one area to be anodic to another area; and (3) inhomogeneity of the electrolyte.

In the past various processes have been used for protecting such metal structures. Galvanizing, powder coating, painting or other chemical or physical adaptation of the metals can occur during the production process. Corrosion control can also take place "in the field" as to prolong the life of metallic structures. The methods for corrosion protection tend to fail after a short period of time when the product is installed.

Generally, in order to eliminate corrosion, the basic rule of thumb, is that is necessary to remove one element in the corrosion triangle in order to prevent corrosion. Generally, the application of coatings is utilized so as to achieve the removal of an element from the corrosion triangle. Unfortunately, coatings and paint have many disadvantages. Typically, coatings and paint will tend to degrade after only six months because of the porous nature of the coatings. It is very labor intensive to remove or repair when in service. A great deal of time is required for conventional protective coatings. Since coatings need to be applied, cured, and dried. Many times, this time period can be in excess of eight hours. During this time period, moisture or other contaminants, have a chance to set and degrade the integrity of the coatings before they are dried. Many coatings contain harmful hydrocarbons and solvents. Which can have an adverse ecological impact. Spreadable coatings generally create approximately 40% non-recoverable waste at the point of application. Everyday damage to the paint or epoxy coating tends to create a failure to the integrity of the entire coating. As such, complete removal and reapplication would be required. The removal of protective paint or epoxy coatings can actually be damaging to the surface they are intended to protect. Often, solid coatings will need to be removed by using solvents and abrasive tools or machinery. This can be damaging, costly, and can create hazardous waste. Generally, most protective coatings will need to be combined with other products in order to offer proper protection, especially for complex structures or where connections/joints are used. Complex structural shapes, such as bolted flanges, or operable components, such as valves, have many different surface area crevices. These can provide a breeding ground for corrosion since moisture can build up and pool for a long periods of time. Generally, painting and coatings will not work because the paint cannot cover or the seal crevices.

In certain circumstances, products other than paint and coatings are utilized to provide such protection. In particular, petrolatum-impregnated tape can be used to wrap around bolts and connections. This petrolatum-impregnated tape is not ecologically or environmentally safe, nor will it create an airtight seal around the structure. As such, it is necessary to rely upon active corrosion inhibitors in order to battle the effects of corrosion. Corrosion will occur naturally because of the porous nature of the tape.

In the past, various patents and patent applications have been issued relating to protective coatings. For example, an early patent was U.S. Pat. No. 2,180,427 issued on Nov. 21, 1939 to Moncrieff et al., for corrosion prevention. This is a liquid composition that contains a nitrogen base which normally has a corrosive action on ions and an alkaline earth metal compound which is convertible by aqueous carbon dioxide into water-insoluble carbonate. When the compound is present in sufficient amounts it can materially inhibit the corrosive action of the nitrogenous base on iron.

U.S. Pat. No. 2,426,379, issued on Aug. 20, 1947 to Swain at al., provides a coating composition containing cellulose acetate. This coating composition is an aqueous emulsion of about 10 parts of a melamine-formaldehyde resin prepared by reacting one mol of melamine with six mols of formalin and reacting the condensation product thereof with butanol. The composition has about 90 parts of cellulose acetate and about 100 parts at a fatty oil-modified phthalic glyceride resin.

U.S. Pat. No. 2,599,384, issued on Jun. 3, 1952 to Gross at al., teaches a solid stick corrosion inhibitor and a process for preventing corrosion of oil and gas well equipment. This composition has a corrosion-preventing inhibitor, a weighting material and three non-related amorphous solids.

U.S. Pat. No. 2,843,503 issued on Jul. 15, 1958 to Salo at al., provides a corrosion-resistant coating that comprises 5 to 40% methylol phenyl allyl ether, 60 to 95% cellulose acetate butyrate, a solid basis and a solvent mixture consisting of toluene xylene, butyl alcohol, isopropyl alcohol and butyl acetate.

U.S. Pat. No. 2,892,725, issued on Jun. 30, 1959 to A. J. Rosenthal, describes a corrosion inhibitor. This corrosion inhibitor is obtained by extruding a 15 to 27% solution of cellulose triacetate in a volatile solvent containing at least 80% of methylene chloride and water. An acetylenic alcohol is incorporated into the solution.

U.S. Pat. No. 2,927,031, issued on Mar. 1, 1960 to A. J. Rosenthal, describes another type of corrosion inhibitor having a solution consisting of a halogen-containing organic solvent of a lower alkanoic acid ester of cellulose and a stabilizing proportion of a member selected from the group consisting of hydroxy lower alkyl amine nitrate and a cadmium salt of a water-insoluble fatty acid.

U.S. Pat. No. 3,220,866, issued on Nov. 30, 1965 to A. J. Rosenthal, describes a corrosion inhibitor having a solution and a halogen-containing organic solvent of a lower alkanoic acid ester of cellulose in a small amount sufficient to substantially inhibit the corrosion of metals of an organotin carboxylate. The carboxylate is non-corrosive to metals and does not have a particular affinity for the cellulose ester.

U.S. Pat. No. 3,505,244 issued on Apr. 7, 1970 to J. C. Cessna, discloses an encapsulated corrosion inhibitor in the form of a free-flowing dry powder of rupturable capsules having a particle size in the range of about 0.1 to 2,000 microns in diameter and having an inner core of a corrosion inhibitor for heat exchange liquid encapsulated within a rupturable outer sheath of a film former. The corrosion inhibitor is present in the capsules in an amount not exceeding about 99% by weight.

U.S. Pat. No. 3,839,051, issued on Oct. 1, 1974 to L. Cerveny, provides a removable or stripable anti-corrosive coating composition. This composition comprises of cellulose acetobutyrate, plasticizers therefor, a corrosion inhibitor in the form of at least one adduct of chromic acid with carbonic acid imine diamide and organic solvent. The composition is made by dissolving the corrosion inhibitor in organic solvent, adding the plasticizer to the solution and then bringing the solution into contact with cellulose acetobutyrate while agitating to form a homogeneous composition.

U.S. Pat. No. 5,081,174, issued on Jan. 14, 1992 to E. J. VanBuskirk, teaches a protective coating composition for use on metals. This coating composition is a combination of a base-neutralized acid-functional copolymer and a wax lubricant. The removability of the coating is enhanced through the use of phosphoric acid as an additive to the coating composition.

U.S. Patent Publication No. 2002/0119252, published on Aug. 29, 2002 to A. Haycox, describes a substance and method for creating a sheath-like protective coating. The substance is brought from a solid state into a liquid state. In the liquid state, it can be sprayed onto a surface. After spraying, it will return the a solid state so as to form a coherent body, free of perforations and of a high degree of toughness. The sheath-like protective coating can be pulled off the surface as a whole or at least in large sections. The substance is of such a nature that it can be repeatedly liquefied by the application of heat and solidified by the removal of heat.

U.S. Patent Publication No. 2008/0171212, published on Jul. 17, 2008 to Shedlosky et al., discloses a protective coating for metals. This protective coating has a crosslinked polyester that is removable with a basic composition.

It is an object of the present invention to provide a polymeric coating system that can be sprayed upon a substrate.

It is another object of the present invention to provide a sprayable polymeric coating that can be applied to inhibit wide variety of corrosion issues.

It is another object of the present invention to provide a polymeric coating system that can be used for bolted or jointed unctions, connections or other operable metallic components.

It is another object of the present invention to provide a polymeric coating system that is reliable and sustainable.

It is a further object of the present invention to provide a polymeric coating system that can be a standalone product.

It is further object of the present invention to provide a polymeric coating system that extends the longevity of the protection.

It is another object of the present invention to provide a polymeric coating system that can be easily and quickly applied.

It is still another object of the present invention to provide a polymeric coating system that can dry rapidly.

It is a further object of the present invention to provide a polymeric coating system that is removable and reusable.

It is still another object of the present invention to provide a polymeric coating system that is ecologically safe.

It is a further object of the present invention to provide a polymeric coating system that can be easily repaired.

These and other objects and advantages of the present invention will become apparent from a reading of the attached specification and appended claims.

BRIEF SUMMARY OF THE INVENTION

The present invention is a polymeric coating composition that includes a cellulose acetate buterate, a plasticizer, a corrosion inhibitor, an epoxidized soil bean oil, a dye, and a stabilizer. The plasticizer is an epoxidized fatty acid ester. The corrosion inhibitor is an epoxidized canola oil. The dye is a silica amorphous. The stabilizer can be either titanium dioxide or aluminum hydroxide.

The cellulose acetate buterate is included in an amount of approximately 29% by weight of the total composition. The plasticizer is added in an amount of approximately 26% by weight of the total composition. The corrosion inhibitor is added in the amount of approximately 36% by weight of the total composition. The epoxidized soil bean oil is added in the amount of approximately 6% by weight of the total composition. The dye and the stabilizer are premixed together in an amount of approximately 3% by weight of the total composition.

The present invention is also a method of applying a polymeric coating to a substrate. This method includes the steps of: (1) mixing a cellulose acetate buterate and a plasticizer and a corrosion inhibitor together to form a solid mixture; (2) heating the solid mixture so as to form a liquid state; (3) painting the substrate with the liquid state; (4) and drying the liquid state on the substrate for a period of time.

In the method of the present invention, the step of heating includes heating the solid mixture to a temperature of greater than 140° C. The step of painting includes spraying the liquid state of the mixture onto the substrate. The substrate can be a solid piece of metal, a bolted connection, a jointed connection, or a junction. Only a single coating of the liquid state is applied to the substrate. The step of drying includes drying the liquid state for a period of time of less than 5 minutes.

The dye and the stabilizer are premixed together. The step of mixing includes adding the premixture of the dye and the stabilizer to the cellulose acetate buterate and the plasticizer and the corrosion inhibitor. The step of mixing further includes mixing an epoxidized soil bean oil to the cellulose acetate buterate and the plasticizer and the corrosion inhibitor.

Specifically, in the present invention, the step of mixing includes introducing the cellulose acetate buterate into a vessel in an amount of approximately 29% by weight of the total composition. The plasticizer is introduced into the vessel in an amount of approximately 26% by weight of the total composition. The plasticizer would be an epoxidized fatty acid ester. The corrosion inhibitor is introduced into the vessel in an amount of approximately 36% by weight of the total composition. The corrosion inhibitor is an epoxidized canola oil. The epoxidized soil bean oil is introduced into the vessel in an amount of approximately 6% by weight of the total composition. The premixture of the dye and the stabilizer is introduced into the vessel in an amount of approximately 3% by weight of the total composition. The dye can be silica amorphous. The stabilizer is titanium dioxide.

This foregoing section is intended to describe, in generality, the preferred embodiment of the present invention. It is understood that variations in this preferred embodiment can be made within the scope of the present invention. As such, this section should not be construed, in any way, as limiting of the broad scope of the present invention. The present invention should only be limited by the following claims and their legal equivalents.

DETAILED DESCRIPTION OF THE INVENTION

The polymeric coating of the present invention has a variety of components. In particular, the components of the polymeric coating of the present invention can include cellulose acetate buterate, plasticizers, a corrosion inhibitor, epoxidized soy bean oil, a dye and a stabilizer. The cellulose acetate buterate, in the preferred embodiment of the present invention, is approximately 29.29% by weight of the total composition. The plasticizer, in the preferred embodiment of the present invention, is an epoxidized fatty acid ester of approximately 25.8% by weight of the total composition. The corrosion inhibitor, in the preferred embodiment of the present invention, is an epoxidized canola oil of approximately 35.79% by weight of the total composition. The epoxidized soy bean oil, in the preferred embodiment of the present invention, is approximately 6.29% by weight of the total composition. The dye is silica amorphous in the preferred embodiment of the present invention. The stabilizer is titanium hydroxide or aluminum hydroxide in the preferred embodiment of the present invention. The dye and the stabilizer are premixed together and are added to the other components in an amount of approximately 2.86% by weight of the total composition.

This composition provides a unique sprayable polymeric coating system that can be applied to address a wide range of corrosion issues. This composition is particularly applicable to the protection of bolted or jointed junction/connections, or operable metallic components. The present invention overcomes the shortcomings of existing corrosion control techniques in order to provide a reliable and sustainable solution. This composition is a standalone product. It does not have to be used with other products in order to get the proper result.

The composition of the present invention provides a significant longevity of protection. It is believed that the composition can provide protection for over 30 years. The composition can be easily and quickly applied, dries very rapidly, is removable and reusable and is also ecologically safe. Damage to this composition can be repaired in the field very easily at the point of damage. All that is necessary is to remove the damaged material and reapply the composition to the damaged area. The composition will adhere to itself since the material is applied in a molten state. This composition, once applied, can be removed with a knife by hand. As such, potential damage to the protective structure is avoided. There is no need for expensive ancillary equipment. As such, this composition allows for a very time efficient process.

Figure 3:
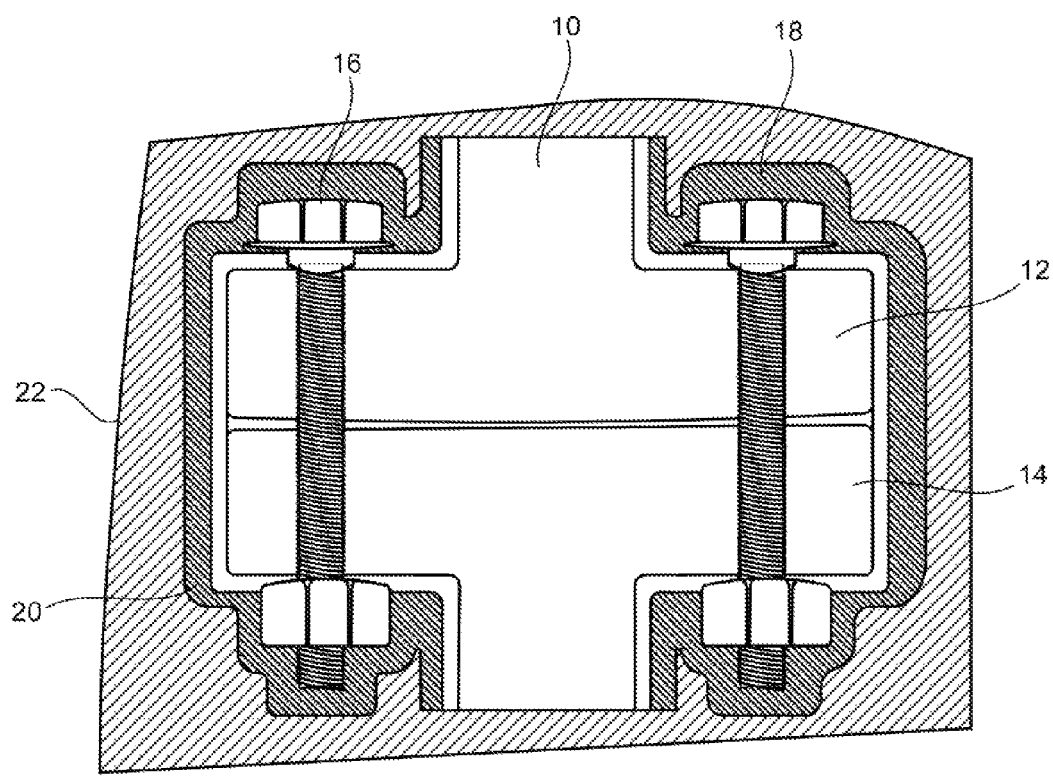
FIG. 3 is a cross-sectional view showing that application of the polymeric coating of the present invention upon a flanged connection.

Composition of the present invention is a solid product at ambient condition below 140° C. As such, heat is required to melt the solid product to a liquid state. Once in a liquid state, the composition of the present invention can be applied to metallic surfaces. Once the liquid composition of the present invention makes contact with the surface, this composition will take form of the shape of the surface and dry very rapidly so as to provide a protective cocoon. Within this cocoon, there are active corrosion inhibiting agents which create a membrane layer between the substrate and the protective coating. With reference to FIG. 3, this protective coating can be easily seen. This membrane layer eradicates any further surface corrosion as well as ensures that foreign contaminates cannot ingress under the encapsulation. When the composition is used on bolted structures, such as that shown in FIG. 3, the inhibiting oils penetrate the thread of the nut and the bolt to ensure that the bolt does not seize internally to the structure and the encapsulation.

With reference to FIG. 3, it can be seen that the coating has been applied to a flanged connection 10. The flanged connection includes an upper flange member 12, a lower flange member 14 and bolts 16 and 18. The bolts 16 and 18 are threadedly secured with the flanges 12 and 14 so as to secure the flanges together. The corrosion inhibitor is formed as an inner layer 20. The inner layer acts immediately and actively when in contact with the surfaces of the flange connection 10. The polymeric resin 22 is on the outside of the corrosion inhibitor and acts as passive protection. The polymeric resin 22 encapsulates the flange connection 10 and avoids ingress of suspended particles, humidity, air, etc.

Figure 1:
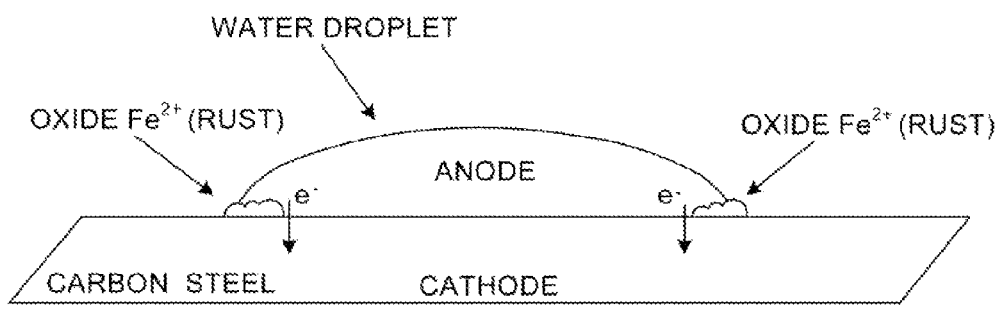
FIG. 1 is a diagrammatic illustration of the corrosion process.
Figure 2:
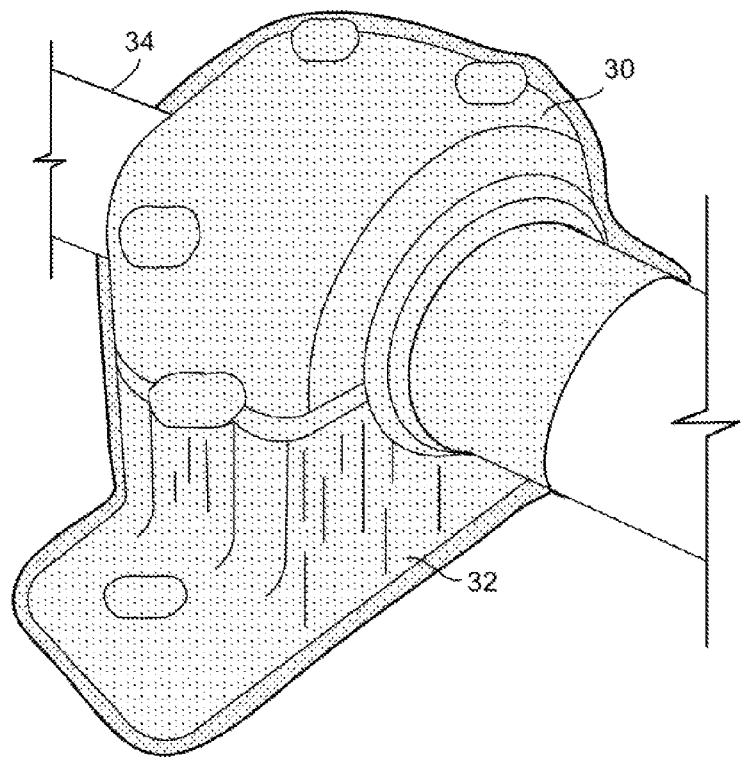
FIG. 2 is a perspective view showing the polymeric coating of the present invention as applied upon a bearing housing.

The flexible coating only creates adhesion through encapsulation. As such, the coating can be removed from the substrate in small portions or as removed as a whole with a knife in an matter of seconds. Another advantage to the composition of the present invention, is that there is no surface tension. As such, the composition can be applied to a moving part, such as a valve, a tap or a bearing housing. In FIG. 2, it can be seen that the protective coating 30 has been applied around bearing housing 32. A shaft 34 extends outwardly of the bearing housing. The economic advantages of the present invention are obvious when compared to other solvent-based products, such as paints or expoxys. The composition of the present invention only requires minimal surface preparation prior to application. This surface preparation can include the removal of loose material, grease, oil build-up, and moisture. The composition of the present invention does not create any waste during the application process. The application to dry time is ¹⁄₂₀ the cure time for most paint coatings. Only one coating of the composition of the present invention is necessary. The coating composition of the present invention has a drying time of less than five minutes. The present invention is able to provide protection very quickly. There is no need to apply a primer, such as in the case of a paint coating. Ultimately, with paint coatings, several coatings of paint are required in order to provide the necessary protection. This can take an excess of two hours to cure. The composition of the present invention can be removed entirely from a substrate and then can be melted down and reused up to six times. The composition of the present invention can be continued to be reused while retaining it complete anti-corrosion properties. The composition of the present invention does not have a hazard classification for transport or disposal. As such, the present invention avoids any expensive disposal cost.

Due to the active nature of the composition of the present invention, along with its ability to retain flexibility, the material can expand and contract along with the substrate that it is protecting. Many other corrosion control products do not have sufficient elasticity or flexibility. As such, this can cause the prior art composition to perish and crack, especially when subjected to large temperature variations.

The foregoing disclosure and description of the invention is illustrative and explanatory thereof. Various changes in the details of the described composition or the steps in the described method can be made which the scope of the present invention without departing from the true spirit of the invention. The present invention should only be limited by the following claims and their legal equivalents.

We claim:

1. A polymeric coating composition consisting of:
    a cellulose acetate butyrate in an amount of 29% by weight of total composition;
    an epoxidized fatty acid ester in an amount of 26% by weight of total composition;
    an epoxidized canola oil in an amount of 36% by weight of the total composition
    an epoxidized soy bean oil in an amount of 6% by weight of the total composition;
    a premixture in an amount of 3% by weight of the total composition, wherein said premixture consists of a mixture of silica amorphous and a stabilizer; and said stabilizer is selected from the group consisting of titanium dioxide or aluminum hydroxide.

* * * * *